Jan. 13, 1953     A. L. JENKINS     2,625,641
GRAVITY SAMPLE HEATER
Filed April 2, 1951
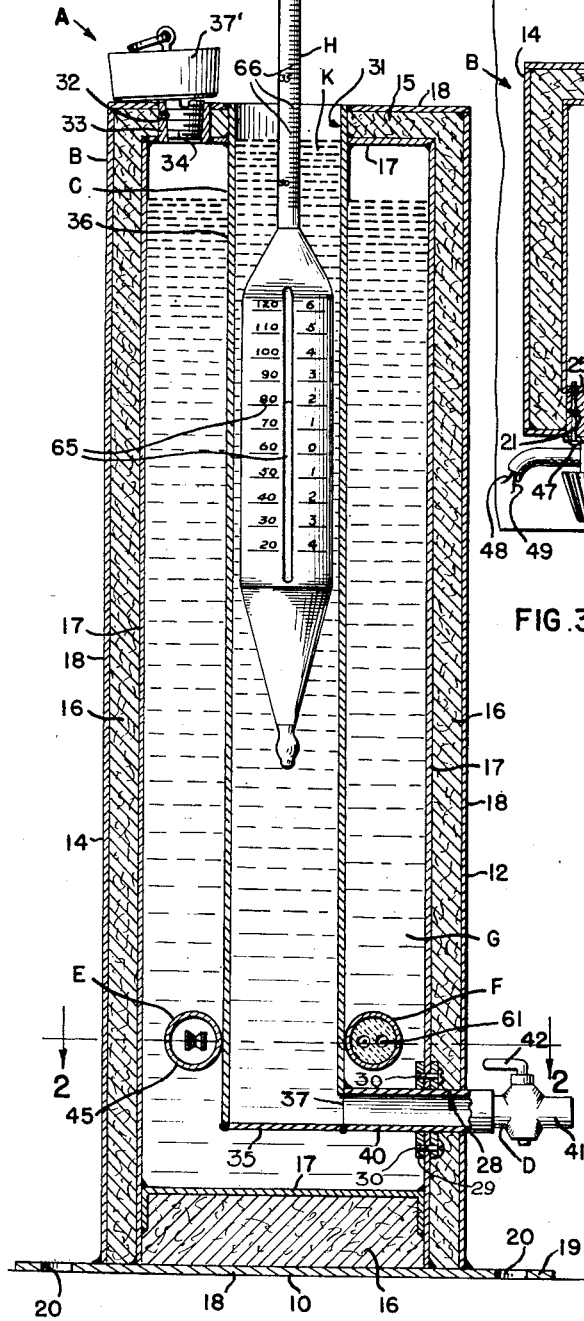
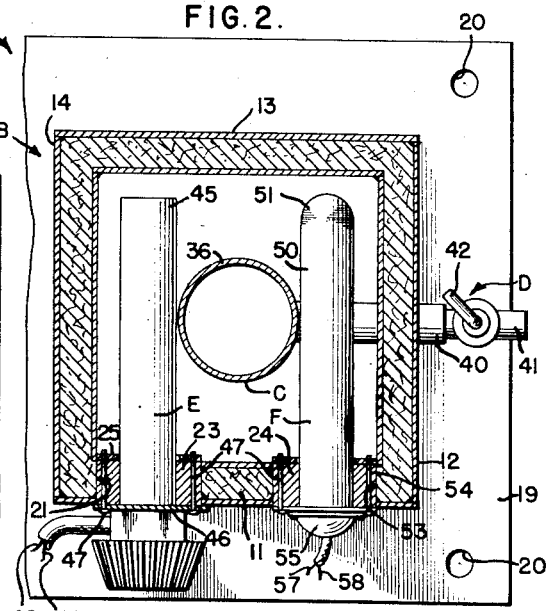
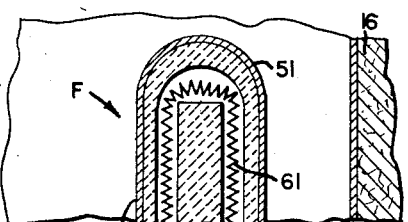
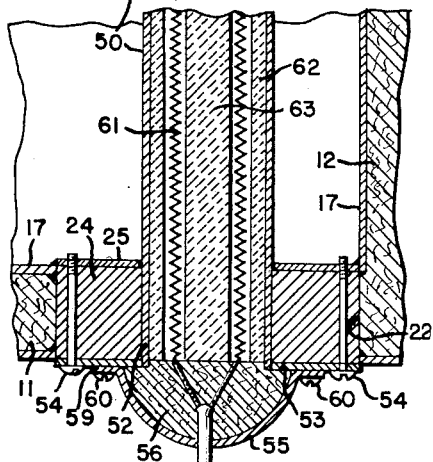
Inventor
AUDREY L. JENKINS Patented Jan. 13, 1953

2,625,641

UNITED STATES PATENT OFFICE 2,625,641

GRAVITY SAMPLE HEATER

Audrey L. Jenkins, Delhi, La.

Application April 2, 1951, Serial No. 218,835

3 Claims. (Cl. 219—38)

This invention relates to heaters for thermally conditioning liquids for tests. Such tests may be to ascertain the specific gravity of the liquid at a certain temperature.

In ascertaining the specific gravity of a more or less viscous crude petroleum at a desired temperature, certain testing standards required by the A. P. I. code must be met and an object of this invention is to provide a heater for such petroleum so as to condition it for A. P. I. code specific gravity tests by means of a suitable hydrometer introduced into the petroleum within the heater.

Another important object is to provide such a heater which is compact and sturdy, may be readily mounted upon a vehicle, as an internal combustion engine-driven one, and which may derive its heat from the 6-volt battery of such a vehicle. This is a convenience, but not a limitation, since heat from a 110-volt source may be employed.

Other objects and advantages of the invention will be apparent during the course of the following detailed description of the invention, taken in connection with the accompanying drawing, forming a part of this disclosure, and in which drawing:

Figure 1 is a vertical section of the new heater charged with a liquid to be tested by a hydrometer shown in elevation, and with the liquid surrounded by a bath heated by a heating element shown in section and controlled by a thermostat shown in section.

Figure 2 is a horizontal section, substantially on the line 2—2 of Figure 1 but with the heater free of liquids.

Figure 3 is a fragmentary longitudinal section of the heating element of Figures 1 and 2 but on an enlarged scale.

In the drawing, wherein for the purpose of illustration is shown a preferred embodiment of the invention and wherein similar reference characters designate corresponding parts throughout the several views, the letter A designates the new heater as a whole and comprising a housing B, containing a sample tube C, draining means D for the tube C, electric current regulating means E for heating means F which is employed to heat a water bath G. A conventional hydrometer is indicated at H immersed in a sample indicated at K, within the tube C.

The housing B is shown as having a bottom wall 10 from which extend upwardly the walls 11, 12, 13 and 14 joining an upper wall 15. Each wall is preferably heat insulated as by any desired conventional heat insulating material 16, as asbestos, enclosed by inner and outer wall portions 17 and 18 respectively, which are preferably metallic. The outer wall portion 18 of the bottom wall may extend outwardly beyond the vertical planes of the walls 11, 12, 13 and 14 and to provide a horizontal flange 19 containing openings 20 for screw or bolt shanks in order to secure the housing to a support. Metallic parts, as the wall portoins 17 and 18 may be welded together.

The bottom wall 10 is imperforate but a wall, such as the wall 11, is provided with two openings 21 and 22 preferably adjacent the bottom of the wall and spaced apart substantially as shown in Figure 2. The openings may be faced with suitable sleeves 23 and 24 held in place by spaced-apart plates or packing 25 in contact with the adjacent inner wall portions 17 and inner end faces of the sleeves 23 and 24, and welded to the adjacent wall portions 17. A wall, as the wall 12, is provided with an opening 28 preferably adjacent its bottom which may have packing means 29 at its inner mouth held in place by screws 30. The upper wall 15 has a preferably centrally-disposed opening 31 and a second or filler opening 32 spaced therefrom and faced with an interiorly screw threaded sleeve 33 which may be welded in place, and this opening may be closed by a suitable exteriorly screw threaded plug 34. As may be seen in Figure 1, the opening 31 contains the upper end portion of the sample tube C which is preferably of brass with a diameter of substantially 1¾ inches and a length of 15 inches. It may be welded to the wall portions 17 and 18 of the upper wall 15 and extend through the chamber of the housing B to a short distance above the bottom wall 10. Its lower end may be closed by a brass disc 35 welded to the tube body 36 and the tube body 36 immediately above the disc 35 is provided with a discharge port 37. It will be noted that the tube body 36 does not project outwardly of the housing B so there is no appreciable loss of heat which loss would occur if the tube projected, and was not insulated. The mouth of the tube body 36 may be closed by a suitable stopper 37', as a rubber stopper to provide a tight closure.

The draining means D includes a conduit 40 welded at its inner end to the tube body 36 to surround the outer mouth of the port 37. This conduit 40 extends through the chamber of the housing, the packing means 29 and opening 28 to project outwardly of the housing a very short distance and receives a suitable conventional manually-operated valve means 41 having a handle 42.

Electric current regulating means E may be a conventional thermostat adapted for immersion in a liquid as by having a conventional tubular liquid-tight housing 45 slidable through the sleeve 23 and retained in place by the plate 46 secured thereto, at the outer end of the tubular housing 45, as by screws 47 extending through the plate 46, sleeve 23 and into the adjacent plate or packing 25. Suitable leads 48 and 49 are electrically connected, as is well known in the art, with the thermostat elements and one extends to the source of electric energy (not shown) while the other (49) extends to one lead of the heating means F next to be described.

I have disclosed a heating means F particularly adapted for my use, such as in conjunction with a 6-volt battery. As shown particularly in Figure 3, there is provided a tubular shell or housing 50, as of steel, closed at its inner end portion 51 and welded or similarly rigidly secured at its outer end portion 52 to an apertured plate 53 which is detachably secured to the housing B as by screws 54 with their shanks extending through openings in the plate 53, sleeve 24, and into the adjacent plate or packing 25, with the housing 50 slidable through the sleeve 24. Closing the outer end of the housing 50 is a suitable closure 55 which is preferably a hollow hemisphere enclosing heat insulation material 56, as asbestos, and through this material and the hemisphere extends suitable leads 57 and 58 with the outer end of one electrically connected with the means E (as with the lead 49 thereof) while the other electrically connected with the source of electric energy (not shown) as is well known in the art. The outwardly-extending flange portion 59 of the closure 55 may be secured to the plate 53 as by screws 60. These leads 57 and 58 are also electrically connected with Nichrome wire 61 to provide a resistance extending through and return the housing 50 between a layer 62 of ceramic material and a core 63 of the same or like material.

It is important that the housings 45 and 50 extending into the chamber of the housing B substantially as in Figures 1 and 2 with their outer surfaces engaging the outer surface of the sample tube B at diametrically opposite sides of the latter. Since the new heater A may be attached to a suitable portion of a motor vehicle, it will be subject to vibrations during movement of the vehicle and the association of these parts of the means B, E and F tends to lessen vibrations of this structure and they mutually aid in supporting one another.

In order to change the heating element for one satisfactory for a different voltage, all that is required is to remove the screws 60, lift off the closure 55 with its insulation material 56 and draw the core 63 and wire 61 out of the shell 50 and replace the removed elements (other than screws 60) with others.

The bath G may be water, oil or the like, introduced through the filler opening 32 and replacing the plug 34. It is desired to introduce the liquid G to nearly the upper wall 15.

When the temperature of the bath G has reached the maximum temperature at which the electric current regulating means E is set, the sample K is introduced into the sample tube to nearly fill the same (allowance being made for the volume of the sample later displaced by the hydrometer H) and the stopper 37' replaced. This introduction of the sample will tend to lower the temperature of the bath G but when it has again reached the testing temperature, the sample will have reached substantially the same temperature and the stopper is removed, the hydrometer H which is equipped for temperature readings as indicated 65, inserted and after an appropriate interval for the temperature reading thereof to be taken, the specific gravity is ascertained at the proper readings 66 and the hydrometer removed to also take the temperature reading. The sample K may now be discharged by opening the valve means 41 and the sample tube C, conduit 40 and the valve means 41 flushed clean of the sample by employing naphtha or benzene, for example, whereupon the valve means is closed for another test.

Various changes may be made to the form of the invention herein shown and described without departing from the spirit of the invention or scope of the claims.

What is claimed is:

1. A sample heater, including a housing having walls, including a side wall, defining a chamber and including an upper wall and an upstanding wall, said upper wall having a sample tube-accommodating opening therethrough and a filler opening to said chamber, and said upstanding wall having two openings therethrough with their axes spaced from the axis of the first opening, a sample tube in said first opening, draining means at the bottom portion of said tube and opening exteriorly of said housing at said side wall thereof, a heating element, having a housing, in one of said two openings and a thermostat, having a housing in the other of said two openings, said housings of said heating element and thermostat extending into said chamber very close to said sample tube and said heating element being very close to said draining means.

2. A sample heater according to claim 1 in which said heating element and said thermostat are disposed adjacent the bottom of said housing and extend to diametrically opposite sides of said sample tube.

3. A sample heater according to claim 1 in which the longitudinal axes of said housings are substantially normal to the longitudinal axis of said sample tube and said housings are disposed at diametrically opposite sides of said sample tube.

AUDREY L. JENKINS.

REFERENCES CITED

The following references are of record in the file of this patent:

UNITED STATES PATENTS

| Number | Name | Date |
| --- | --- | --- |
| 2,045,466 | Hellbach | June 23, 1936 |
| 2,164,282 | Morris | June 27, 1939 |